June 8, 1965 J. LOS 3,187,569

MASS FLOW METER

Filed Oct. 22, 1962 2 Sheets-Sheet 1

INVENTOR
Johannes Los
BY Cushman, Darby & Cushman
ATTORNEYS

June 8, 1965 J. LOS 3,187,569
MASS FLOW METER
Filed Oct. 22, 1962 2 Sheets-Sheet 2

INVENTOR
Johannes Los
BY Cushman, Darby & Cushman
ATTORNEYS

United States Patent Office 3,187,569
Patented June 8, 1965

3,187,569
MASS FLOW METER
Johannes Los, Joh. van der Waalsstraat 58 hs,
Amsterdam, Netherlands
Filed Oct. 22, 1962, Ser. No. 231,974
7 Claims. (Cl. 73—196)

The invention relates to a mass flow meter of the type which measures temperature changes produced by the transport of heat by a flow of fluid flowing through the instrument. More in particular it relates to a mass flow meter of the type which comprises individual tube members for conducting a mass flow, means provided at the ends of said tube members creating equal temperature differences between points along said tube members and temperature sensitive electrical resistance elements attached in good thermal contact to said tube members and forming part of an electric comparison device, e.g., a Wheatstone bridge.

A mass flow meter of this construction, which is especially adapted to measure small mass flows of very corrosive gases, such as $F_2$, $HF$ and $UF_6$, is disclosed by the article of A. F. Brown and H. Kronberger in "Journal of Scientific Instruments," page 151, vol. 24, June 1947. In this known mass flow meter two tube members are positioned in alignment and connected in series so as to form parts of one single straight tube. The tube so formed is heated in the middle and is kept at room temperature or cooled at the ends. To keep the temperatures of the relatively far-distanced ends of the tube equal long heavy yokes or a long heavy jacket of the heat well conducting material are required at the thermal interconnection of the tube ends. This construction results in large dimensions and relatively great weight of the mass flow meter. Moreover this mass flow meter can only be used for measuring the intensity of one single mass flow.

The primary object of the present invention is to provide an improvement in a mass flow meter of the above type which makes it possible to reduce the size and weight of the thermal connection of the one ends as well as of the other ends of the tube members.

A further object is to associate in one single instrument of relatively small dimensions a plurality of parallel operating mass flow meters, which instrument is adapted to measure both the magnitude of a mass flow and the ratio between different mass flows.

These and other objects and advantages are achieved, broadly, by extending the tube members side by side. For measuring the magnitude of a mass flow the tube members may constitute the legs of a U-shaped tube and for measuring the ratio between a number of different mass flows they may be inserted in separate conduit circuits. The ends of the members which are to be thermally interconnected as well as the other ends may be mounted closely together in a common block of the heat well conducting material. Such a block has a small dimensions and can be easily brought up to and maintained at a uniform temperature throughout.

In caloric mass flow meters of this kind the variations of the resistance of the temperature sensitive elements are not only proportional to the mass flows flowing through the tube members but also inversely proportional to the areas of the cross-sections of the walls of the tube members or, if the wall thicknesses are small with respect to the diameters of the tube members, inversely proportional to the wall thicknesses. If, when the other variables ar maintained constant, the ratio of the cross-sectional areas of the tube walls be made equal to the desired ratio of the mass flows flowing through the tube members, proportionally equal variations of said mass flows will influence the electrical measuring circuit in the same manner. In that case different mass flows may be measured as well as compared with one another. Moreover, it is possible to connect the measuring tubes for many individual mass flows separately or in groups one after the other with their temperature-sensitive resistance elements in a comparison bridge having always the same constant comparison resistances and the same measuring instrument, so that a great number of systems may be checked, registered and/or controlled one after the other. Such a common instrument used for many systems is for instance important for checking, registering and/or controlling the gas flows to and from a great number of simultaneously operating gas centrifuges, such as ultracentrifuges for the separation of gaseous mixtures of isotopes.

The caloric mass flow meter of the present invention may be advantageously constructed in such a manner that between the means for the creation of equal temperature differences along the tube members at least one additional heat conductor formed as a rod or a tube may be mounted. The rod or tube does not conduct mass flow and is provided with a temperature sensitive resistance element forming part of the comparison bridge. This resistance element or each of these resistance elements then serves as constant comparison resistance in the bridge and renders the bridge independent of the temperature difference along the tube members. This construction makes it also easily possible to scan, by means of one and the same instrument, a great number of mass flows or groups of mass flows.

The invention will be further elucidated with the aid of the accompanying drawing wherein like reference numerals indicate the same or analogous elements.

Figure 1:
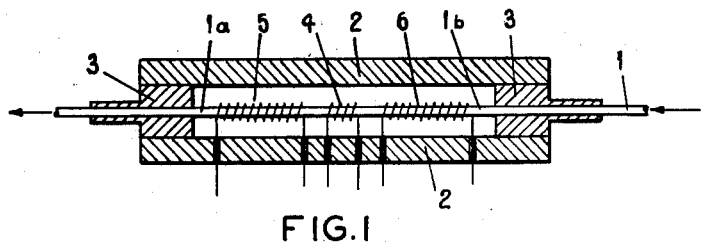
FIGURE 1 is a sectional view of a mass flow meter of known construction.

The known mass flow meter shown in FIGURE 1 consists of a tube 1 of, for instance, nickel and having by way of example a diameter of 2 mm. and a wall thickness of 0.1 mm. The tube 1 is mounted in a casing or jacket 2 of the heat well conducting material, e.g., copper, having a relatively large wall thickness. The end walls 3 of the casing 2 surround the end portions of the tube 1 and have therewith a good thermal contact. The casing 2, 3 keeps the end portions of the tube at equal temperatures, e.g., room temperature. Mounted around the middle of the tube 1 is an electric heating spiral 4 by means of which the middle of the tube 1 is brought to a predetermined higher temperature, say a temperature which is 100° C. higher than that of the end portions of the tube. Temperature sensitive electrical resistance spirals 5, 6, e.g., spirals of platina, are mounted for good thermal contact with the tube portions $1a$ and $1b$. The resistance spirals 5, 6 are connected in a Wheatstone bridge. In the casing 2, 3 a high vacuum is maintained.

The operation of this mass flow meter is based on the electrical resistance variations of the spirals 5, 6 caused by the difference of heat transport in the tube portions $1a$ and $1b$, said heat transport occurring when gas or liquid flows through the tube 1. If the gas flow is zero, equal quantities of heat will be carried off from the middle to each of the ends of the tube 1 and the resistance variations of the spirals 5, 6 caused by the raise of temperature will be equal, so that the measuring instrument of the Wheatstone bridge will not give any indication. However, when gas flows through the tube 1, there will be heat transport in the direction of the gas flow, so that the resistance variations of the spirals 5, 6 will be different and the measuring instrument of the Wheatstone bridge will give an indication. When the parts of the mass flow meter are dimensioned in the right way this indication will be proportional to the gas flow.

Figures 2, 3:
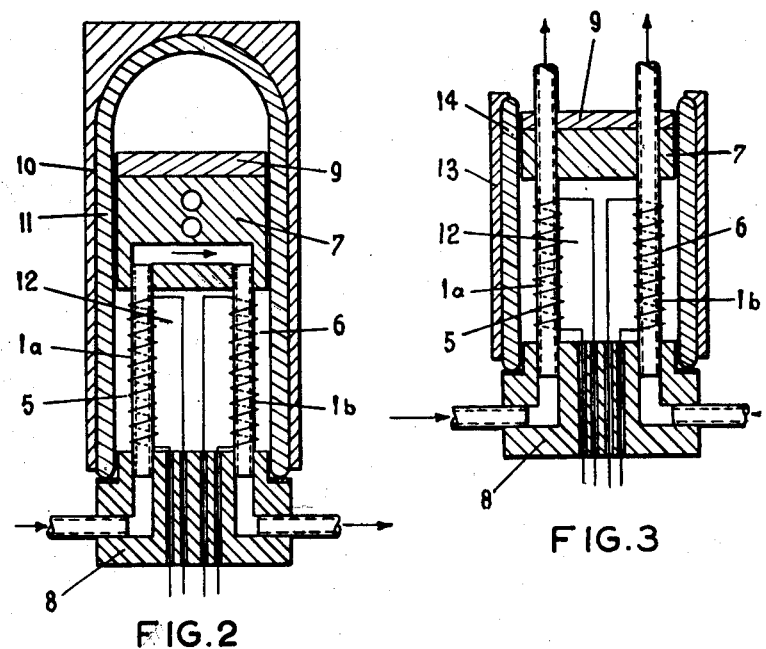
FIGURE 2 is a sectional view of a mass flow meter according to the invention for measuring the intensity of a mass flow.
FIGURE 3 is a sectional view of a mass flow meter according to the invention for measuring the ratio between two mass flows.

In the mass flow meter according to the invention, which is illustrated in FIGURES 2 and 3, the tube members 1a and 1b extend side by side and are mounted with their ends in blocks 7, 8 of the heat well conducting material, such as copper. The block 7 is brought to and kept at a predetermined higher temperature by a heat source 9, and the block 8 is cooled to room temperature or less. The tube members 1a and 1b are provided in the same manner as illustrated in FIGURE 1, with heat sensitive resistance spirals 5, 6 which are connected in a bridge of resistances.

In FIGURE 2 the tube members 1a, 1b form the legs of a U-shaped continuous tube, which together with the block 7 and the heat source 9 is accommodated in a casing 10 provided with a heat insulating lining 11. In the space 12 of the casing 10 a high vacuum is maintained. This mass flow meter serves to measure the intensity of a mass flow.

In FIGURE 3 the tube members 1a and 1b form portions of separate conduit circuits. The space 12 between the blocks 7 and 8 is surrounded by an insulating jacket 13, 14 and is kept under high vacuum. With the aid of this meter the ratio between two individual mass flows can be defined. It is also possible to compare in this manner more than two mass flows with one another.

Figure 4:
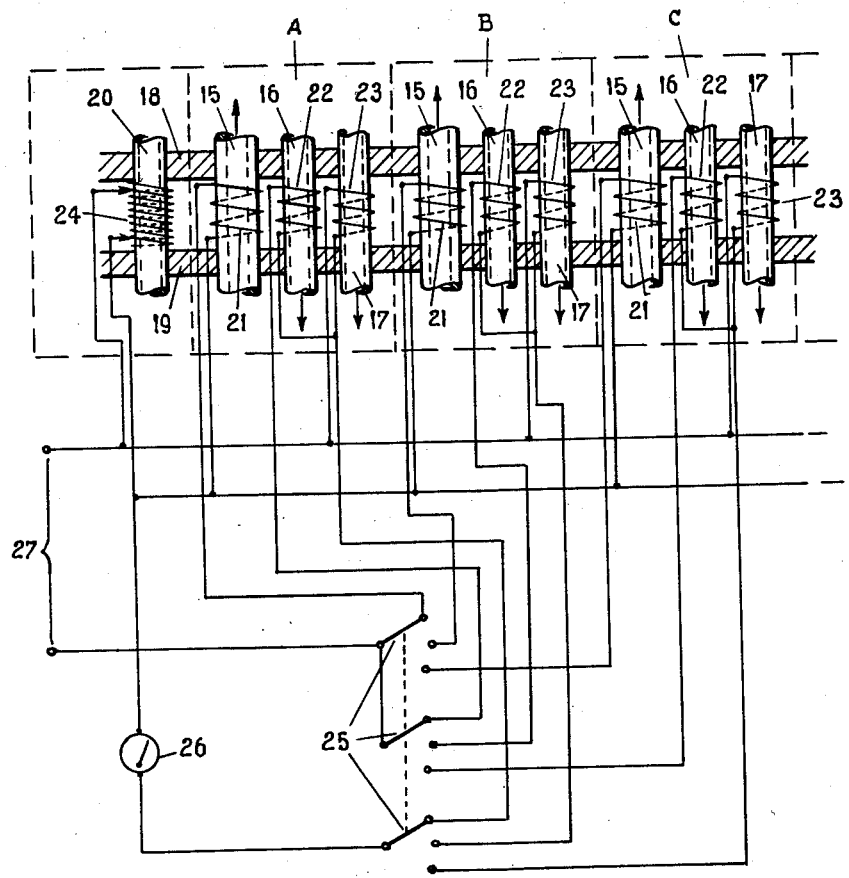
FIGURE 4 is a sectional view of a part of a mass flow meter which is common to a plurality of groups of measuring tubes.

The combined mass flow meter illustrated in FIGURE 4 consists of a number of groups A, B, C, etc. of three tube members 15, 16, 17, which all extend between a heated block 18 and a cooled block 19 of the heat well conducting metal. Moreover there is mounted between the blocks 18 and 19 an additional tube 20, which, if desired, may be replaced by a rod since the tube 20 is not used for conducting a mass flow. All tube members 15, 16, 17 and 20 are provided with temperature sensitive electrical resistance spirals 21, 22, 23, 24. By means of a three-pole throw-over switch 25 the resistance spirals 15, 16, 17 of any one of the groups A, B, C may be so combined with the resistance spiral 24 as to form a Wheatstone bridge, in which a measuring, checking, registering or controlling instrument 26 is provided. This bridge is fed at 27.

The ratio between the areas of the cross-sections of the walls of the tube members 15, 16, 17 or, approximately, the ratio between the wall thicknesses of the tube members is equal to the desired ratio of the mass flows flowing through the tube members under operational circumstances. The illustrated mass flow meter may be used for the purpose of checking, registering and/or controlling a number simultaneously operating ultracentrifuges for the separation of a gas mixtures, e.g., mixtures of gaseous isotopes, one after the other. In that case the supply of gas mixture is led through the tube member 15 having the larger wall thickness and the separation components are led through the tube members 16 and 17 having the smaller wall thicknesses. The ratio between said wall thicknesses is approximately equal to the ratio between the gas flows, so that when for instance the gas flows discharged from the checked ultracentrifuge are equal to one another the wall thickness of the tube member 15 will be about twice as large as that of each of the tube members 16 and 17, since the gas flow supplied to the centrifuge is equal to the sum of the gas flows discharged from the centrifuge.

If not only the ratio between the wall thicknesses of the tube members of each individual group but also these ratios between the different groups are chosen in the right way, that is, in accordance with the desired ratios between all gas flows, the resistance 24 need be adjusted only once in order to be useful as comparison resistance to all groups A, B, C, etc. Then the different groups of measuring tubes can be scanned with great speed one after the other by the instrument 26. If each group should contain only two measuring tubes, two comparison resistances may be used in the same manner as resistance 24 to constitute the bridge.

Due to the fact that the resistance value of the resistance spiral 24 depends in the same way on the temperature difference between the blocks 18 and 19 as that of the resistance spirals 15, 16, 17 the indication of the instrument 26 will be independent of said temperature difference.

It will be appreciated from the above description that the present invention provides a mass flow meter of compact dimensions and low weight and of great versatility. While specific embodiments have been described and illustrated, the details thereof are not intended to be limiting except as they appear in the appended claims.

What I claim is:

1. A caloric mass flow meter comprising: at least two individual tube members for conducting a mass flow, said tube members extending side by side; means provided at the ends of said tube members for creating equal temperatures differences along said tube members; and temperature sensitive electrical resistance elements attached in thermal contact to said tube members and forming part of an electric comparison device, and wherein there is mounted between the means for the creation of equal temperature differences along the tube members at least one heat conductor in addition to said mass flow tube members, said heat conductor being also provided with a temperature sensitive electrical resistance element forming part of the electric comparison device.

2. A caloric mass flow meter according to claim 1 wherein the tube members comprise at least two individual mass flow conduit circuits.

3. A caloric mass flow meter according to claim 2 wherein the tube members are of equal active lengths and wherein the ratio of the areas of the cross-sections of the walls of said tube members is equal to the desired ratio of the mass flows to be flowed through said tube members.

4. A caloric mass flow meter, comprising a plurality of parallel tube members for conducting a mass flow, two blocks of the heat well conducting material, said blocks being provided at the ends of said tube members and adapted to produce equal temperature differences along the portions of said tube members extending between said blocks and temperature sensitive resistance elements attached in good thermal contact to said tube members, said tube members being provided in at least two groups of at least two tube members which extend closely together side by side and the temperature sensitive resistance elements of the tube members of each individual group being adapted to be inserted in and to form part of an electric comparison device.

5. A caloric mass flow meter as claimed in claim 4, comprising tube members of equal lengths, the ratio of the areas of the cross-sections of the walls of the tube members of each individual group being equal to the desired ratio of the mass flows flowing through said tube members.

6. A caloric mass flow meter as claimed in claim 4 in which each group of tube members, consists of three tube members of which one is adapted to conduct a composite mass flow and the other two are each adapted to conduct individual components of said mass flow after its separation in a separating device.

7. A caloric mass flow meter is claimed in claim 4, comprising at least one additional heat conductor formed as a rod or a tube without mass flow and a temperature sensitive resistance attached in good thermal contact to said additional heat conductor, said heat conductor also extending between the two blocks and the temperature sensitive resistance of the said additional heat conductor forming a permanent reference element of the comparison bridge.

References Cited by the Examiner

UNITED STATES PATENTS 2,594,618 4/52 Booth _____ 73—204
2,946,220 7/60 Cogniat et al. _____ 73—196

RICHARD C. QUEISSER, *Primary Examiner.*
ROBERT L. EVANS, *Examiner.*